(12) United States Patent
Affre De Saint Rome et al.

(10) Patent No.: US 8,770,860 B2
(45) Date of Patent: Jul. 8, 2014

(54) TIGHTLY SEALED CONNECTION ASSEMBLY WITH PIVOTING VALVES

(75) Inventors: Ronan Affre De Saint Rome, Carantec (FR); Alain Philippe, Change (FR)

(73) Assignee: Souriau, Versailles (FR)

( * ) Notice: Subject to any disclaimer, the term of this patent is extended or adjusted under 35 U.S.C. 154(b) by 0 days.

(21) Appl. No.: 13/467,187

(22) Filed: May 9, 2012

(65) Prior Publication Data

US 2012/0301081 A1    Nov. 29, 2012

(30) Foreign Application Priority Data

May 10, 2011    (FR) ...................... 11 54033

(51) Int. Cl.
    *G02B 6/38*    (2006.01)

(52) U.S. Cl.
    USPC ............ 385/75; 385/55; 385/70; 439/134; 439/138; 439/142

(58) Field of Classification Search
    USPC ....... 385/55–94; 439/93, 134, 142, 521, 892, 439/893
    See application file for complete search history.

(56) References Cited

U.S. PATENT DOCUMENTS

| | | | |
|---|---|---|---|
| 4,176,897 A | | 12/1979 | Cameron |
| 5,716,224 A | * | 2/1998 | Masuda et al. ................ 439/138 |
| 6,179,479 B1 | * | 1/2001 | Crivelli ............................ 385/73 |
| 7,857,524 B2 | | 12/2010 | Dobler |
| 7,918,674 B2 | * | 4/2011 | Dufresne de Virel ......... 439/138 |
| 2002/0115319 A1 | | 8/2002 | Mori |

FOREIGN PATENT DOCUMENTS

| | | |
|---|---|---|
| DE | 4422134 | 2/1995 |
| EP | 2146232 | 1/2010 |
| EP | 2148396 | 1/2010 |

OTHER PUBLICATIONS

French Search Report dated Oct. 25, 2011, corresponding to French Priority Application No. 11 54033.

* cited by examiner

*Primary Examiner* — Mark Robinson
*Assistant Examiner* — Zachary A Nemtzow
(74) *Attorney, Agent, or Firm* — Young & Thompson

(57) ABSTRACT

A connector assembly includes:
  a plug (10) including a body (11), an insert (12) and contacts (13) housed longitudinally in the insert, and a front face closed off by a first closure valve (15) positioned radially on the plug,
  a socket (20) including a body (21), a spacer (27), an insert (22) and contacts (23) housed longitudinally in the insert, and a front face closed off by a second closure valve (25) positioned radially on the socket,
  the body (11) of the plug being capable of getting inserted into the body (21) of the socket during a coupling, providing for a connection of the contacts (13) of the plug with the contacts of the socket,
  the first and second closure valves being capable of pivoting simultaneously and getting housed inside the plug and the socket during the coupling of the plug and the socket.

17 Claims, 5 Drawing Sheets

TIGHTLY SEALED CONNECTION ASSEMBLY WITH PIVOTING VALVES

FIELD OF THE INVENTION

The invention pertains to a tightly sealed connector assembly provided with closure valves ensuring tight sealing against dust and moisture when the connectors are uncoupled. These closure valves are designed to close off the plug and the socket of the connector assembly when they are uncoupled and to get housed within the plug and the socket when these two elements are coupled.

The invention finds application in the field of connection systems and especially in the field of connection systems in harsh environments such as connection systems for military and aeronautical equipment and optical connection systems where protection against dust and moisture is of especially vital importance.

PRIOR ART

In the field of connection systems, a connector assembly generally comprises a male connector, called a plug, and a female connector, called a socket, the connectors containing electrical contacts or optical contacts and being designed to get coupled to each other to set up electrical or optical conduction between the contacts of the plug and those of the socket.

In a harsh environment, i.e. in an environment subjected to dust, rain, spray, etc., the connector assemblies have to be tightly sealed. To this end, each connector assembly is generally provided with tight-sealing means whose purpose is to protect the contacts.

At present, the tight-sealing means take the form of a pair of closing-off stoppers, one placed before the front face of the plug and the other before the front face of the socket. They are generally screwed on or clipped on to the body of the plug or the socket. These two stoppers are withdrawn from the plug and the socket just before said plug is coupled with said socket. To prevent these stoppers from getting lost and enable them to be re-utilized when the plug and the socket are uncoupled, they are generally connected to the connectors by a small chain or a cable.

This pair of stoppers has the drawback of having to be withdrawn before the connector assembly is coupled together. Thus, during the coupling phase, dust and moisture can get inserted into the plug and/or the socket, polluting the contacts. Besides, these stoppers evidently require space, both after coupling, since they are attached to the connectors, and before coupling, since they require a certain amount of space to enable them to be removed.

There are other known tight-sealing means, which take the form of tilting lids. One tilting lid is fixed before the front face of the plug and another before the front face of the socket. Each lid is fixed by means of a return spring which keeps the lid in a closed position. During the coupling of the plug and the socket, the user has to make each of these lids tilt before coupling the connectors.

Such tight-sealing means have the drawback of being difficult to handle for the user and of requiring considerable work space to allow the user to tilt the lids and hold them in a tilted position before coupling the connectors. Furthermore, as in the case of the closing-off stoppers, they have to be telescopically retracted before the coupling is done, and this entails problems of pollution of the contacts.

These tight-sealing means in the form of stoppers or lids also have the drawback of requiring that the connector be cleaned before it is closed to prevent dust and other pollution from being carried into said connector. Such a cleaning operation is indispensable in the case of optical connectors.

Besides, these tight-sealing means are mounted externally to the connectors and may therefore be damaged or may hamper external elements. For example, the closing-off stoppers and the tilting lids may be torn off or damaged by impacts or friction. They may also block the passage, in a pulley or in a chute, of the cable on which the connector is mounted. In the case of a cable being towed, they may also cause drag in the water.

Other tight-sealing means are known in the field of connection systems. These tight-sealing means take the form of deformable lips which open out to let through the electrical contacts. Tight-sealing means of this type are generally used for connectors designed to be coupled underwater. To this end, the lids are generally constituted by a thick deformable seal which is impermeable when pinched radially and releases only a small diameter to let through contacts during coupling.

These tight-sealing means have the drawback wherein the ratio of the surface area available for the contacts to the footprint in section is relatively low.

The existing solution closest to that of the invention is one based on the use of one closure valve on the socket and one closure valve on the plug as presented in the document EP2146232. When the plug penetrates the socket, its closure valve tilts inwards through a moveable part that belongs to the plug and moves back into the plug. The closure valve of the socket opens towards the interior of the socket pushed by the central part of the plug bearing the contacts. The two closure valves therefore tilt in opposite directions. This system has two drawbacks:

- The soiled face of the closure valve of the socket is located in the same area as the contacts after connection, inducing a spreading of dust within the coupled connector. This phenomenon is aggravated by the fact that the closure valve of the socket is scraped by the body of the plug during coupling.
- This system is poorly integrated into a round connector because the shafts or pins of the closure valves are situated on the periphery of said closure valves. According to such a system, a flat closure valve that covers the entire front face of the body of a circular connector would not be able to pivot through the 90° needed to allow the entry of the connector. To enable this rotation, the closure valve covers only a part of the front face of the disk. The aperture released by the closure valve to let through the contacts is therefore reduced for a given space requirement.

SUMMARY OF THE INVENTION

Figure 1:
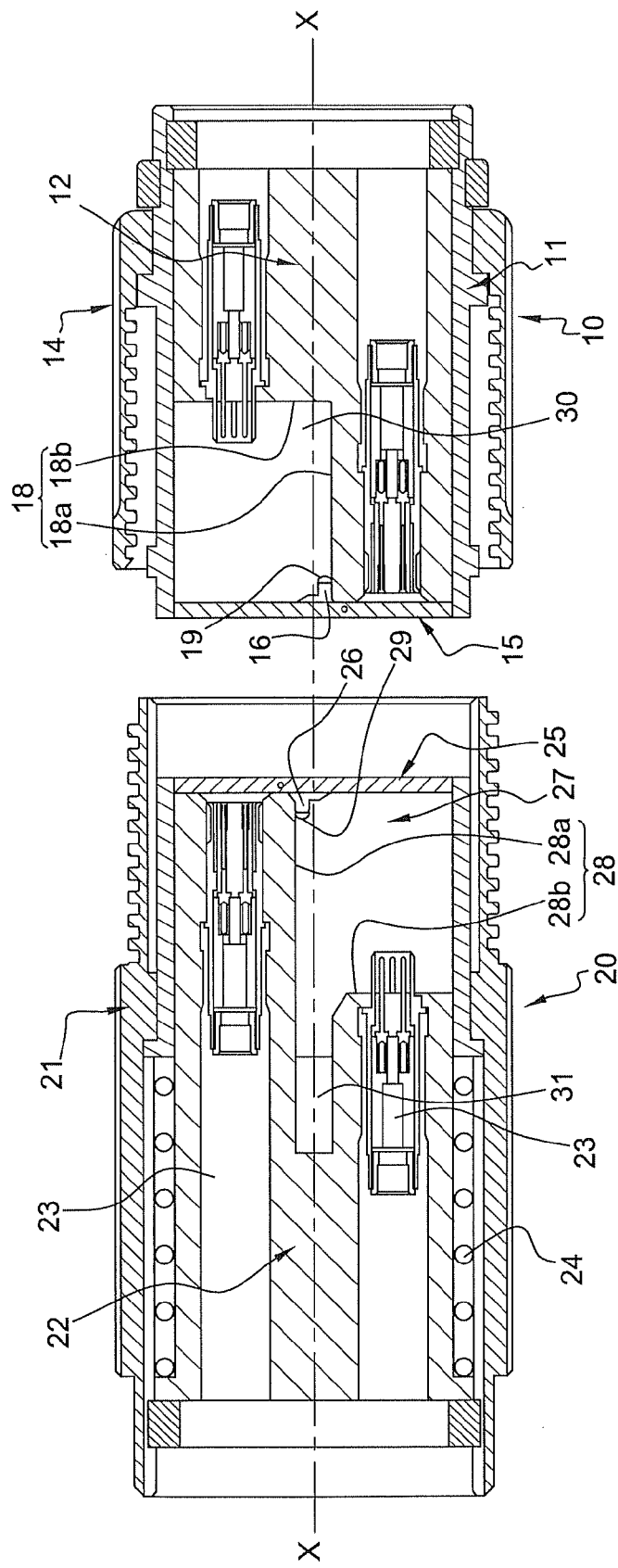
FIG. 1 shows a side view in section of a plug and a socket of a connector assembly according to the invention.

The invention is aimed precisely at overcoming the drawbacks of the techniques explained here above. To this end, the invention proposes a connector assembly, for which the tight sealing is obtained by means of closure valves closing the front face of the connectors and capable of pivoting and getting housed inside the connectors during the coupling. This connector assembly has the advantage of including no element external to the connector assembly, thus minimizing its external space requirement. It furthermore has the advantage of enabling the coupling of the connectors without any preliminary withdrawal of the tight-sealing means.

In particular, this connector assembly has the advantage of optimizing the space available for the contacts and confining the soiled face of each closure valve between the two closure valves thus preventing the dispersal of dust into the connector, this characteristic being particularly advantageous for an optical connector.

More specifically, the invention pertains to a connector assembly comprising:
- a plug including a body, an insert and contacts housed longitudinally in the insert,
- a socket comprising a body, a spacer, an insert and contacts housed longitudinally in the insert,
- the body of the plug being capable of getting inserted into the body of the socket during a coupling, providing for a connection of the contacts of the plug with the contacts of the socket.

This connector assembly is characterized by the fact that:
- the plug comprises a front face closed by a first closure valve positioned radially on the plug,
- the socket comprises a front face closed by a second closure valve positioned radially on the socket,
- the first and second closure valve being capable of pivoting simultaneously and getting housed inside the plug and the socket during the coupling of said plug and said socket.

This connector assembly has a limited space requirement, reduced to the strict minimum because it has no element external to the connectors.

It furthermore has the advantage of entailing no risk of pollution of the contacts since the closure valves pivot as and when the two connectors get coupled.

The connector assembly of the invention may comprise one or more of the following characteristics:
- the first and second closure valves are capable of pivoting about a same pivoting shaft or pin during the coupling of the connectors.
- the first closure valve has a first protrusion and the second closure valve has a second protrusion forming, with the first protrusion, the pivoting shaft,
- the body of the plug has a first trench and the spacer of the socket has a second trench, the first and second trenches forming a cavity capable of receiving and guiding the protrusions (16, 26).
- each trench has a C-shaped end and each trench has a section adapted to the shape of the ends of said trenches.
- the insert of the plug has a front face that is substantially L-shaped, the insert of the socket has a face having a substantially inverted L shape, the insert of the plug and the insert of the socket having shapes complementary to each other.
- the insert of the plug and the insert of the socket each have a housing capable of at least partially receiving the first and the second closure valves after they have pivoted.
- the housing is made by hollowing out a part of the front face of the insert.
- the plug and the socket each comprise at least one return means providing for a return of the closure valve to the radial position when the plug and the socket are uncoupled.
- each closure valve has, on its periphery, a seal providing, on the one hand, the tight sealing with the plug or the socket and, on the other hand, the isolation of the pollution situated on the external face of the closure valves during the tilting of said closure valves inside the connector.
- the connector assembly has an O-ring placed between the spacer and the body of the socket in order to provide for tight sealing of the socket alone and then of the full connector after coupling.
- the plug and the socket have a generally rectangular shape, and the first and the second closure valves, respectively of the plug and the socket, each have two flaps capable of pivoting in pairs about two pivoting shafts positioned laterally on either side of said flaps.

DETAILED DESCRIPTION OF EMBODIMENTS OF THE INVENTION

Figure 5:
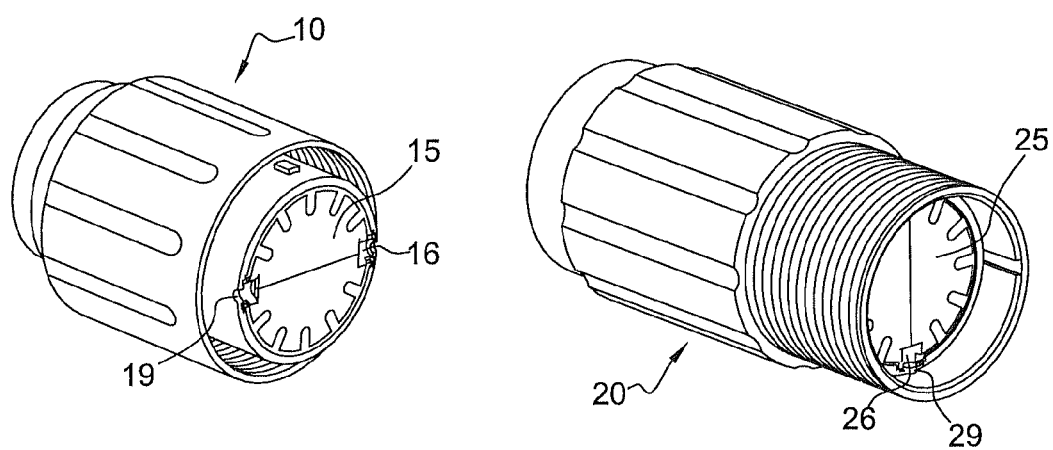
FIG. 5 is a view in perspective of the plug and socket of the connector assembly of FIG. 1.

The invention pertains to a tightly sealed connector assembly, an example of which is shown schematically in FIGS. 1 and 5. This connector assembly has two connectors, namely a plug 10 and a socket 20.

Like any connector plug, the plug 10 has a body 11 which is cylindrical in the example of FIG. 1. This body 11 is equipped within itself with an insert 12 longitudinally crossed by contacts 13. Similarly, the socket 20 has a body 21, also cylindrical in the example of FIG. 1. This body 21 is provided within itself with an insert 22 longitudinally crossed by contacts 23. The body of the plug has a smaller diameter than that of the socket in order to be able to be inserted into the socket during the coupling, or connection, of the two connectors. After the plug and the socket have been connected, a locking ring 14 fixed to the body 11 of the plug holds the two connectors in a connected position.

According to the invention, the shape of the insert 12 of the plug has a substantially L section 18. The front face of the insert 12 is thus divided into two longitudinally offset parts forming a step 18*a* and a counter-step 18*b*. Similarly, the shape of the insert 22 of the socket has a section 28 substantially in the shape of an inverted L, complementary to the shape of the insert 12 and adapted to getting fitted into the L shape of the insert 12 of the plug. The front face of the insert 22 is thus divided into two longitudinally offset parts forming a step 28*a* and a counter-step 28*b*. A spacer 27 provides a mechanical link between the insert 22 and the body 21 of the socket.

According to the invention, the plug 10 is closed on its front face by a first closure valve 15 positioned along an axis perpendicular to the central axis X of the plug. Similarly, the front face of the socket 20 is closed by a second closure valve 25 positioned along an axis perpendicular to the central axis X of the socket. The front face of the plug is the radial face of said plug situated facing the socket. Similarly, the term "front face of the socket" denotes the radial face of said socket situated facing the plug.

The closure valve 15 is mounted on the body 11 of the plug. The closure valve 25 is mounted on the spacer 27 of the socket. The closure valves 15 and 25 are capable of pivoting about a common geometrical axis, called a pivoting axis. To this end, each of the closure valves 19 and 25 comprises, on its periphery, two diametrically opposite protrusions 16 and 26. To enable the rotation of the closure valves 15 and 25, the protrusions 16 slide in the trenches made in the body 11, thus forming a pivot link. At the same time, the protrusions 26 slide in the trenches made in the spacer 27 forming a second pivot link.

When the closure valves are put into contact at the beginning of the coupling, the axes of the two pivot links described here above coincide with each other.

Figure 2:
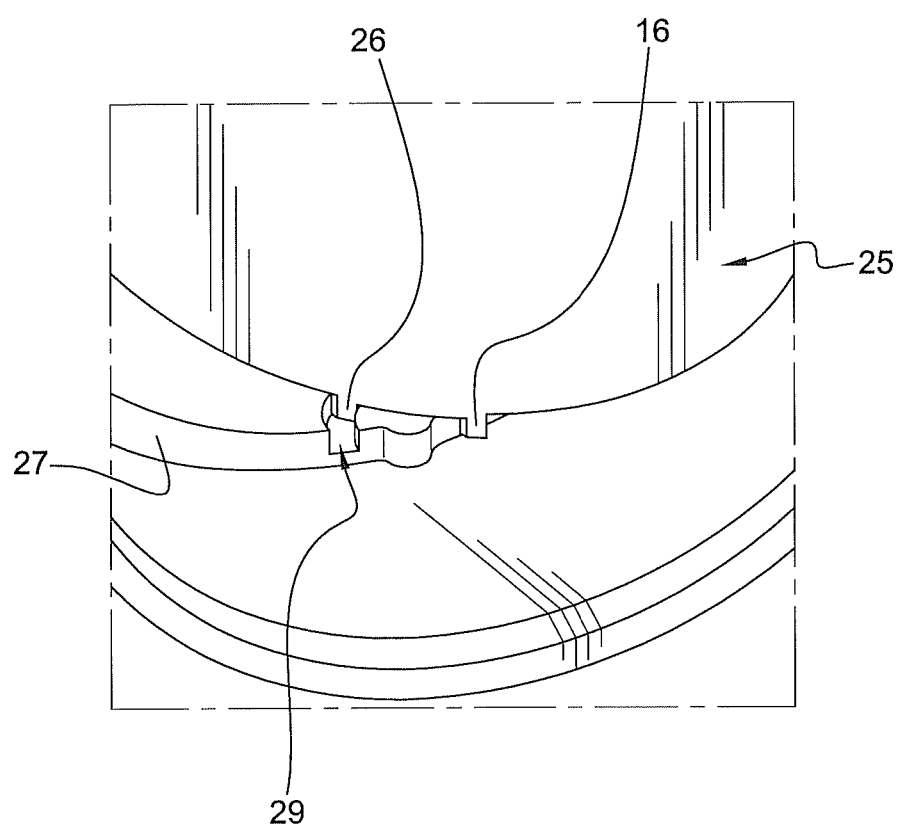
FIG. 2 shows the rotational axis system of the connector assembly of the invention.

An example of a protrusion 26 of the closure valve of the socket and of the trench 29 is shown in FIG. 2. More specifically, this FIG. 2 shows the closure valve 25 of the socket with one of its protrusions 26. This protrusion 26 slides in the trench 29 made in the spacer 27. FIG. 2 shows only the socket and its closure valve in a slightly open position, the closure valve 15 of the plug being mounted symmetrically with the closure valve 25 of the socket. Symmetrically with the protrusion 26 of the socket, the protrusion 16 of the plug slides in a trench 19 made in the body 11 of the plug. This trench is a semi-cavity designed to receive and guide the protrusions 16 and 26 in rotation. The trench 19 and the protrusion 16 of the plug have not been shown in detail because they are similar to those of the socket except that they are made on the body 11 of the plug and not on the spacer. The two trenches each forming a semi-cavity are designed, at the time of connection of the two connectors, to be adjoined so as to form a single cavity serving as a guide to a pivoting shaft formed by the protrusions 16 and 26. This cavity may have a ring shape when the two connectors are attached.

Thus, during the coupling of the plug 10 and the socket 20, the two closure valves 15 and 25 come into contact with each other until they are positioned flat against each other, and then they pivot together around the pivoting shaft 16/26. This pivoting takes place in a rotation of about 90° relatively to the initial radial position of the closure valves, i.e. relatively to the axis perpendicular to the central axis X of the connectors. When the two closure valves are adjoined, the set of two connectors behaves as if there were only one closure valve pivoting about a single axis. Indeed, during the coupling, when the closure valves are in contact, the pivots (the protrusion and the trench) of the closure valves of the plug and the socket have coinciding geometrical axes of rotation, causing a closure valve to rotate in the circular trench of its connector and goes in part into the trench of the facing connector.

Each of the connectors of the assembly has a housing suited to at least partially receiving the closure valves 15, 25. These housings are made by hollowing out a part of the front face of each insert. FIG. 1 shows a housing 30 made in the insert 12, between the contacts 13 in the direction of said contacts. It also shows a housing 31 made in the insert 22 between the contacts 23, in the direction of said contacts. The dimensions of these housings 30 and 31 match those of the closure valves so that the latter can be completely contained in these two housings.

In the example of FIG. 1, the housing 31 of the socket is longer than the housing 30 of the plug because, in the socket, the closure valves penetrate in the insert (rotation plus translation) because of the translation of the spacer while, on the plug side, the closure valves only rotate (without translation) relatively to the insert. Furthermore, the body of the socket may comprise a return spring providing for the return of the spacer to the initial position, this spring being situated behind the spacer.

Figure 3:
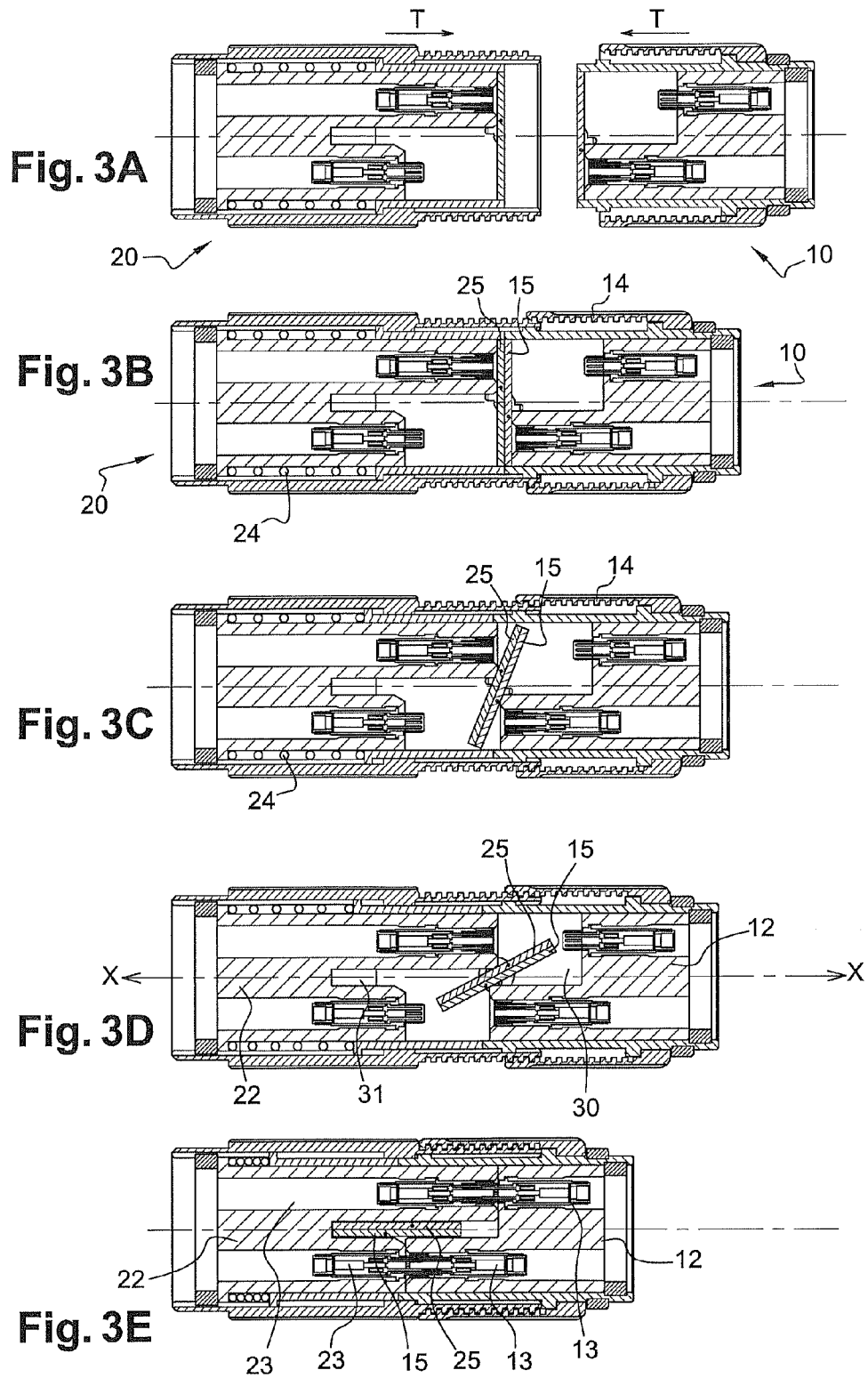
FIGS. 3A to 3E represent the different steps of the coupling of the plug and the socket of FIG. 1.

FIGS. 3A to 3E give a schematic view of the different positions of the two connectors during the phase for coupling the assembly. FIG. 3A shows the plug 10 and the socket 20 separately as in FIG. 1. FIG. 3B shows the plug 10 and the socket 20 when they are in contact, i.e. when the closure valves 15 and 25 are placed flat against each other. In FIG. 3C, the two closure valves 15 and 25 start pivoting under the effect of the tensile stresses T enabling the plug 10 to be inserted into the socket 20. In this figure, it can be seen that the adjoined closure valves diverge simultaneously from their radial position. The closure valves are put into rotation by the contact force that the insert exerts on the closure valve when the spacer of the socket and the body of the plug bearing the axis of the closure valves, or the X axis, penetrate in compressing the spring 24. The force needed for the penetration of the spacer is given by the screwing in of the locking ring 14.

Since, in its initial position, each closure valve 15, 25 is in contact with the leg of the L of the insert 12, 22, the pivoting of the adjoined closure valves can occur only in one sense, namely the clockwise sense. It must be noted however that this sense can be inverted if the L shape or the inverted L shape of the inserts 12 and 22 are reversed.

FIG. 3D shows the plug 10 and the socket 20 when said plug continues to get inserted into said socket. At this coupling level, the rotation of the attached closure valves reaches almost 90° relative to the axis perpendicular to the axis X. It can be seen in this figure that the attached closure valves will get housed in appropriate housings made in the inserts 12 and 22.

FIG. 3E shows the plug 10 and the socket 20 completely coupled. In this figure, the attached closure valves are totally pivoted to be in a longitudinal position, i.e. in the central axis X of the connector assembly. The closure valves are then housed between the two inserts 12 and 22, between the contacts 13, 23, in the direction of said contacts. In this position, the contacts 13 are connected to the contacts 23.

As can be seen in FIG. 3E, when the connector assembly is connected, no element of the tight-sealing means of the invention is external to the connectors. All the elements enabling the tight sealing of the connector assembly are situated inside the assembly, thus limiting the risks of damage or drag.

It will be understood from the above that each closure valve offers tight sealing to a connector of the assembly, whatever the position of said connector. In the uncoupled position, the connector is protected by the closure valve in a radial position. During the coupling procedure, the connector is protected by the closure valve so long as said connector is not at least partially fitted into the other connector, the closure valve pivoting only after partial insertion of the plug into the socket. The tight sealing of the connectors is therefore ensured throughout the connection procedure.

When the connector assembly is uncoupled, it is necessary for each of the closure valves to return to the initial position, i.e. to its radial position. This return to position of the closure valves is obtained by means of return springs. These return springs can be tension springs or else torsion springs. These springs are preferably fixed on the part comprising the pivoting shaft. They can be fixed for example to the insert 12 or the body 11 of the plug and to the spacer of the socket. If the return springs of the socket are fixed to the spacer, they will have the advantage of having to get deformed only in proportion to the travel related to the rotation of the closure valve and not in proportion to the travel related to the translation of the spacer in the body of the socket.

When the connectors are uncoupled, it is necessary for each of the closure valves to remain in the radial position and for its protrusion not to go beyond the trench. To this end, the protrusions and/or the trenches are provided with locking means. These locking means can be a stop, for example situated on the spacer, constituted by the insert etc. In this way, each closure valve can pivot only in one sense, for example in the clockwise sense in the case of FIG. 3. In another example, these locking means can be constituted by a section of the protrusions in a C shape, at the end of said protrusions and by a trench of complementary shape. Such locking means enable the protrusions forming the pivoting shaft to slide in the cavity without being able to get extracted from said cavity. It must be noted that the protrusions and cavities which enable the rotation of the closure valves can be inverted, i.e. that the C-shaped protrusions can be on the body of the plug or on the spacer of the socket and that the cavities can be on the closure valves.

Figure 4:
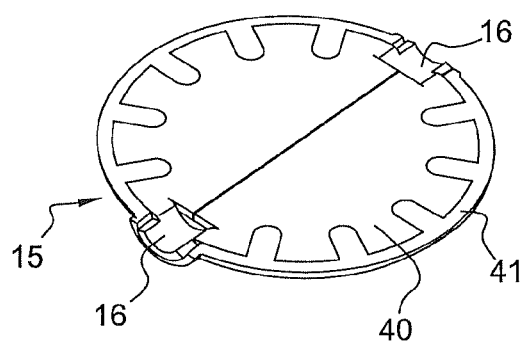
FIG. 4 is a view of the front face of a closure valve according to a first embodiment of the invention.

Whatever the embodiment of the connectors of the invention, each closure valve must be rigid and made so as to be tightly sealed in order to protect the interior of the connector from dust and moisture. To this end, the closure valve may comprise a rubber seal on its periphery. FIG. 4 represents an example of a closure valve according to the invention. This closure valve is a plug closure valve 15, it being understood that the socket closure valve 25 is identical. This closure valve 15 has a closure valve body 40, for example made of metal, provided with protrusions 16 and a seal 41 surrounding the closure valve body 40. The closure valve can also be made out of an elastomer over-molded on a metal part giving said closure valve its rigidity and forming its protrusion, the elastomer layer constituting a seal.

In one embodiment of the invention, the tight sealing of the connector is obtained by means of an O-ring placed between the spacer and the body of the socket. This O-ring provides for tight sealing of the socket alone when the socket and the plug are uncoupled and of the full connector when they are coupled. This O-ring can be mounted in addition to the seal 41 surrounding the body of the closure valve.

The above description is that of a circular-sectioned connector assembly. It must be noted that the invention can be adapted to any form of connector, for example to square-sectioned or rectangular-sectioned connectors.

Figure 6C:
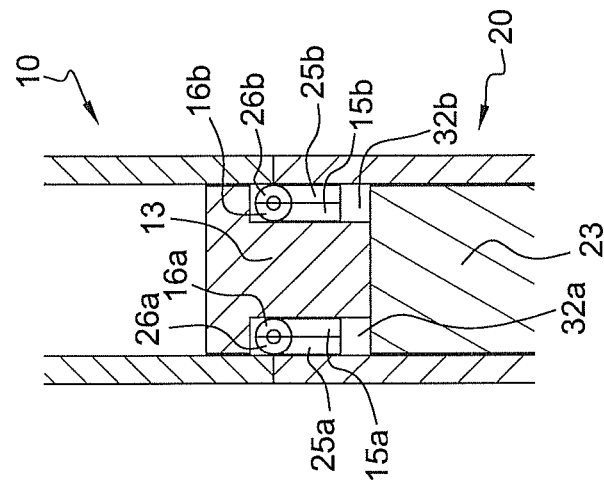
FIGS. 6A, 6B and 6C show a schematic sectional view of closure valves according to a second embodiment of the invention.
Figure 6B:
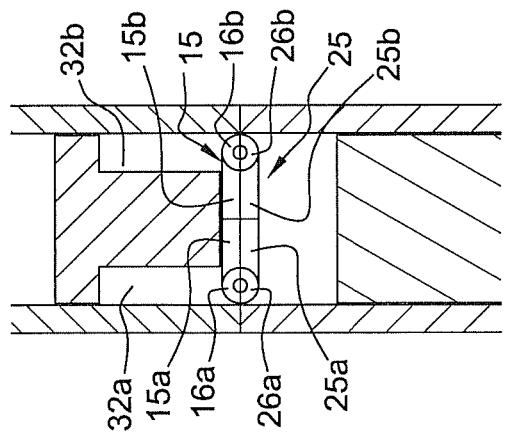
Figure 6A:
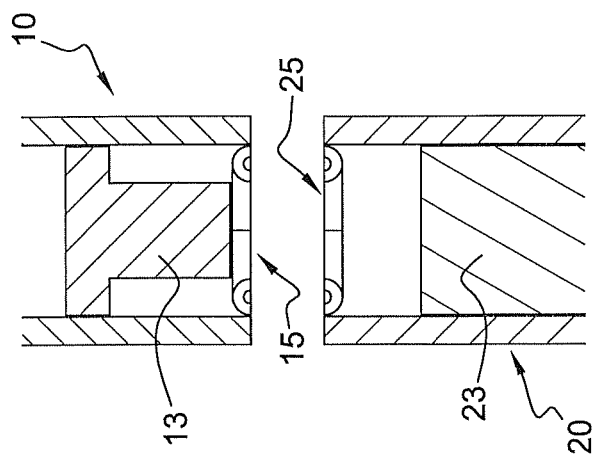

In the case of a generally square or rectangular connector, the closure valves may be flap valves. FIGS. 6A, 6B and 6C represent a schematic sectional view of an embodiment of closure valves of this kind. In this embodiment, the closure valve 15 of the plug and the closure valve 25 of the socket each have two flaps, respectively 15a, 15b and 25a and 25b. Each flap corresponds in its dimensions to a semi-closure valve. These flaps are capable of pivoting in pairs around two pivoting shafts positioned laterally on either side of said flaps. More specifically, a flap 25a of the closure valve 25 of the socket and a flap 15a of the closure valve 15 of the plug are capable of pivoting together about a pivoting shaft 16a/26a situated on the external side (close to the socket body and the plug) of said flaps. Symmetrically, a flap 25b of the closure valve 25 of the socket and a flap 15b of the closure valve 15 of the plug are capable of pivoting together about a pivoting shaft 16b/26b situated on the external side of said flaps.

In this embodiment, the pivoting shafts are constituted by protrusions 16 and 26 as described here above. Similarly, the closure valves are identical to the closure valves of the embodiment described here above except that they are each constituted by two flaps. Their role is also identical.

As shown in FIG. 6C, the flaps of the closure valves 15 and 25 are housed, after coupling, in two distinct housings 32a and 32b, formed on either side of the insert 13 of the plug. As will be understood from FIGS. 6A to 6C, these housings 32a and 32b have dimensions suited to the dimensions of the flaps of the closure valves.

The invention claimed is:

1. A connector assembly, comprising:
   a plug (10) that comprises a body (11), an insert (12) fitted in the body, and contacts (13) housed longitudinally in the insert; and
   a socket (20) comprising a body (21), with a spacer (27) and an insert (22) both fitted inside the body, the spacer providing a mechanical link between the insert (22) and the body, and said insert having contacts (23) housed longitudinally therein,
   the body (11) of the plug being capable of being inserted into the body of the socket during a coupling, providing for a connection of the contacts (13) of the plug with the contacts (23) of the insert of the socket,
   wherein the plug comprises a front face closed by a first closure valve (15) positioned perpendicular to a central axis of the plug,
   wherein the socket comprises a front face closed by a second closure valve (25) positioned perpendicular to a central axis of the socket, and
   wherein the first closure valve (15) and the second closure valve (25) comprise pivot links (16, 26, 19, 29) suitable for both pivoting simultaneously about a geometrical pivoting axis that is perpendicular to the central axis of the plug and the central axis of the socket during a coupling of the plug and the socket, said closure valve (15) and said second closure valve (25) both being housed inside the plug and the socket when said plug and said socket are coupled.

2. The connector assembly according to claim 1, wherein the first closure valve (15) has a first protrusion (16) and the second closure valve (16) has a second protrusion (26) forming a pivoting shaft with the first protrusion.

3. The connector assembly according to claim 2, wherein the body of the plug has a first trench (19) and the spacer of the socket has a second trench (29), the first and second trenches forming a cavity capable of receiving and guiding the first and second protrusions (16, 26).

4. The connector assembly according to claim 3, wherein each of said first and second protrusions (16, 26) has a C-shaped end, and each of said first and second trenches (19, 29) has a section adapted to the shape of the ends of said first and second protrusions.

5. The connector assembly according to claim 1, wherein the insert (12) of the plug has a front face that is substantially L-shaped, the insert (22) of the socket having a face with a substantially inverted L shape, and the insert of the plug and the insert of the socket having shapes complementary to each other.

6. The connector assembly according to claim 5, wherein the insert (12) of the plug and the insert (22) of the socket each have a housing (30, 31) capable of at least partially receiving the first and the second closure valves (15, 25) after the first and the second closure valves (15, 25) have pivoted.

7. The connector assembly according to claim 6, wherein the housing (30, 31) is made by a recess in the front face of the insert.

8. The connector assembly according to claim 1, wherein the plug (10) and the socket (20) each comprise at least one return means providing for a return of the closure valve to a radial position when the plug and the socket are uncoupled.

9. The connector assembly according to claim 1, wherein a periphery of each closure valve has a seal providing a tight sealing with the plug or the socket and isolation of pollution situated on an external face of the closure valves during a tilting of said closure valves inside the connector.

10. The connector assembly according to claim 1, further comprising:
    an O-ring between the spacer and the body of the socket in order to provide for tight sealing of the socket alone and of the connector assembly after coupling.

11. The connector assembly according to claim 1, wherein the plug and the socket have a generally rectangular shape, and the first and the second closure valves, respectively of the plug and the socket, each have two flaps (15*a*, 15*b*, 25*a*, 25*b*) capable of pivoting in pairs about two pivoting shafts (16*a*/16*b*, 16/26*b*) positioned laterally on either side of said flaps.

12. The connector assembly according to claim 2, wherein the insert (12) of the plug has a front face that is substantially L-shaped, the insert (22) of the socket having a face with a substantially inverted L shape, and the insert of the plug and the insert of the socket having shapes complementary to each other.

13. The connector assembly according to claim 3, wherein the insert (12) of the plug has a front face that is substantially L-shaped, the insert (22) of the socket having a face with a substantially inverted L shape, and the insert of the plug and the insert of the socket having shapes complementary to each other.

14. The connector assembly according to claim 4, wherein the insert (12) of the plug has a front face that is substantially L-shaped, the insert (22) of the socket having a face with a substantially inverted L shape, and the insert of the plug and the insert of the socket having shapes complementary to each other.

15. The connector assembly according to claim 2, wherein the plug (10) and the socket (20) each comprise at least one return means providing for a return of the closure valve to a radial position when the plug and the socket are uncoupled.

16. The connector assembly according to claim 2, a periphery of each closure valve has a seal providing a tight sealing with the plug or the socket and isolation of pollution situated on an external face of the closure valves during a tilting of said closure valves inside the connector.

17. The connector assembly according to claim 2, further comprising:
    an O-ring between the spacer and the body of the socket in order to provide for tight sealing of the socket alone and of the connector assembly after coupling.

* * * * *